United States Patent [19]

Tamura et al.

[11] Patent Number: 5,041,272

[45] Date of Patent: Aug. 20, 1991

[54] METHOD FOR REMOVING NITROGEN OXIDES FROM EXHAUST GASES

[75] Inventors: Takaaki Tamura, Tokyo; Mikio Kumagai; Akimichi Katsuta, both of Chiba, all of Japan

[73] Assignee: Institute of Research and Innovation, Tokyo, Japan

[21] Appl. No.: 672,137

[22] Filed: Mar. 19, 1991

Related U.S. Application Data

[63] Continuation of Ser. No. 504,156, Apr. 3, 1990, abandoned.

[30] Foreign Application Priority Data

Dec. 8, 1989 [JP] Japan .................. 1-319228

[51] Int. Cl.$^5$ .................. B01J 8/00; C01B 17/00
[52] U.S. Cl. .................. 423/239
[58] Field of Search .................. 423/239, 239 A

[56] References Cited

U.S. PATENT DOCUMENTS

| | | | |
|---|---|---|---|
| 3,689,212 | 9/1972 | Pettit et al. | 423/239 |
| 4,013,588 | 3/1977 | Tamura | 252/454 |
| 4,097,576 | 6/1978 | Tamura et al. | 423/239 A |
| 4,157,375 | 6/1979 | Brown et al. | 423/239 |
| 4,297,328 | 10/1981 | Ritscher et al. | 423/239 |
| 4,950,461 | 8/1990 | Schuetjo et al. | 423/239 |

FOREIGN PATENT DOCUMENTS

| | | |
|---|---|---|
| 3642018 | 6/1987 | Fed. Rep. of Germany . |
| 3830045 | 3/1990 | Fed. Rep. of Germany . |
| 53-39200 | 10/1978 | Japan . |
| 54-8351 | 4/1979 | Japan . |
| 61-36977 | 8/1986 | Japan . |
| 1474119 | 5/1977 | United Kingdom . |
| 1488017 | 10/1977 | United Kingdom . |

Primary Examiner—Gregory A. Heller
Attorney, Agent, or Firm—Rothwell, Figg, Ernst & Kurz

[57] ABSTRACT

A method for removing nitrogen oxides from exhaust gases containing oxygen and moisture, which comprises bringing the exhaust gas into contact with hydrogenated zeolite catalysts or hydrogenated zeolite catalysts impregnated with one or more kinds of metals selected from the group consisting of copper, zinc, vanadium, chromium, manganese, iron, cobalt, nickel, rhodium, palladium, platinum, and molybdenum, in the presence of organic compounds. The zeolite should be a zeolite having a silica/alumina ratio of 5 or above. The zeolite may be any one of zeolite of Y type, zeolite of L type, zeolite of offretite-erionite mixed crystal type, zeolite of ferrierite type, zeolite of mordenite type, zeolite of clinoptilolite type, and zeolite of ZSM-5 type.

3 Claims, No Drawings

METHOD FOR REMOVING NITROGEN OXIDES FROM EXHAUST GASES

This is a continuation of application Ser. No. 07/504,156 filed Apr. 3, 1990, now abandoned.

BACKGROUND OF THE INVENTION

1. Field of the Invention

The present invention relates to a method of treating exhaust gases, especially those discharged from diesel engines, gasoline engines or gas turbines which contain excess oxygen and moisture as well as nitrogen oxides (abbreviated as $NO_x$ hereinafter). The method comprises bringing the exhaust gas into contact with a zeolite catalyst in the presence of organic compounds, thereby converting $NO_x$ in the exhaust gas into harmless nitrogen gas.

2. Description of the Prior Art

There are several practical methods for removing $NO_x$ from exhaust gases. For example, the selective reduction method is applied to exhaust gases from boilers which employs the $V_2O_5$-$TiO_2$ catalyst and ammonia gas as the reducing agent. The method applied to exhaust gases from gasoline engines consists of controlling the air-fuel ratio (hence the oxygen concentration) and removing $NO_x$, carbon monoxide, and hydrocarbons all at once by the use of the ternary catalyst. (See Funahiki and Yamada, "Catalysts for Automotive Exhaust Gas", Preprints of the Meeting for Theoretical Fundamental Study of Practical Catalysts, Catalysis Society of Japan, p. 15–20, 1989.) The former method has an advantage of being effective for removing $NO_x$ from exhaust gases containing excess oxygen, but it has also a disadvantage of requiring ammonia gas as the reducing agent. Therefore, it is useful for special applications but not for general uses. Especially, it can hardly be applied to vehicles carrying a diesel engine of compression ignition type and to small- or medium-sized stationary boilers. The latter method using the ternary catalyst is not effective for exhaust gases containing excess oxygen and hence it is not of practical use for exhaust gases from diesel engines.

SUMMARY OF THE INVENTION

It is an object of the present invention to provide a method for removing $NO_x$ effectively which can be applied to exhaust gases containing excess oxygen without the need of using ammonia.

This object is fulfilled by using as the catalyst hydrogenized zeolites as such or hydrogenated zeolite catalysts impregnated with one or more kinds of metals selected from the group consisting of copper, zinc, vanadium, chromium, manganese, iron, cobalt, nickel, rhodium, palladium, platinum, and molybdenum, in the presence of organic compounds. Thus, according to the present invention, it is possible to selectively remove nitrogen oxides from exhaust gases containing excess oxygen.

DETAILED DESCRIPTION OF THE INVENTION

According to the present invention, hydrogenated zeolites are used as a catalyst or catalyst support. The hydrogenation of the zeolite is carried out either by a direct method or an indirect method. The former method involves the steps of washing the zeolite with mineral acids repeatedly and exchanging cations in the zeolite with hydrogen ions. The latter method involves the steps of washing the zeolite with ammonium ion-containing water repeatedly, replacing cations in the zeolite with ammonium ions, and calcining the zeolite thereby volatilizing ammonia. Both methods can be used for the present invention.

One of the most important features of the present invention is to use hydrogenated zeolites. Zeolite without hydrogenation removes $NO_x$ very little as demonstrated in Example 1 and Comparative Example 1 which follow. There are no restrictions as to the species of the zeolites to be used in the present invention; it may be either a synthetic one or a naturally occurring one, so long as it is hydrogenated.

It is well known that the acid resistance of a zeolite depends on the silica/alumina ratio which indicates the chemical composition of the zeolite, and that the smaller the silica/alumina ratio, the lower the acid resistance. It is also known that hydrogenated zeolites are hydrophobic and have the properties of solid acids, the strength of which depend also on the silica/alumina ratio. (See Course of Catalysts, vol. 10, compiled by the Catalysis Society of Japan, published by Kodansha, 1986.) These facts may suggest that the activity of catalysts supported on zeolites will greatly vary depending on the silica/alumina ratio. The present inventors found from many experiments on a variety of zeolites that desired catalysts in the present invention are obtained by hydrogenating zeolites having a silica/alumina ratio higher than about 5, as demonstrated in Examples 1 and 2 that follow. In addition, more active catalysts are obtained by hydrogenating zeolites having a silica/alumina ratio higher than about 10, as demonstrated in the same examples.

According to the present invention, the hydrogenated zeolite catalyst can be prepared by hydrogenating a synthetic zeolite (such as zeolite of Y type, zeolite of L type, zeolite of offretite-erionite mixed crystal type, zeolite of ferrierite type, zeolite of mordenite type, and zeolite of ZSM-5 type) or a natural zeolite (such as zeolite of mordenite type and zeolite of clinoptilolite type), as shown in the following Examples. They are exemplary but not limitative.

According to the present invention, the catalyst is used in the presence of organic compounds as a reducing agent. The organic compounds include hydrocarbons such as methane, ethane, propane, butane and fuel oil as well as alcohols, ketones, and ethers. In other words, the method of the present invention permits a much wider selection of reducing agent than the conventional selective reduction method which resorts to ammonia as the reducing agent.

The impregnation of metallic elements in the zeolite may be accomplished by stirring the hydrogenated zeolite (prepared as mentioned above) in an aqueous solution of salts of desired metallic elements followed by separating from the solution, drying and calcining the treated zeolite (This method will be referred to as the first impregnation method.) Alternatively, the impregnation may be accomplished by contacting the zeolite with an aqueous solution of salts of desired metallic elements and then with water containing ammonium ions and finally heating the treated zeolite for volatilizing ammonia. (This method will be referred to as the second impregnation method.) The second method may be performed by reversing the order of contacting. (This method will be referred to as the third impregnation method.)

In Examples explained later, experiments were carried out using synthetic zeolites of TSM series produced by Toso Co., Ltd., which include zeolites of Y type, L type, offretite-erionite mixed crystal type, ferrierite type, mordenite type, and ZSM-5 type. These zeolites were hydrogenated by dipping in 4N hydrochloric acid at 100° C. for 4 hours and then thoroughly rinsing and drying. Experiments were also carried out using natural zeolites, which include mordenite-containing tuff (from Akita Prefecture) and clinoptilolite-containing tuff (from Fukushima Prefecture). The natural zeolites were hydrogenated by washing repeatedly with heated hydrochloric acid (2 mol/L) for 40 hours.

The catalytic activity of the hydrogenated zeolites, with or without metallic elements supported thereon, were tested in the following manner. The powder of the hydrogenated zeolite was molded under pressure, then crashed and sieved to collect particles with diameters between 10-20 mesh. The sample (5 cm$^3$) was filled in a stainless steel reactor tube 10 mm in inside diameter. Through this reactor tube was passed a simulated exhaust gas composed of 0.15 vol% NO, 10 vol% oxygen, and 7.3 vol% moisture, with the balance being argon. As an organic compound as the reducing agent, propane was added into this exhaust gas in an amount equivalent to 4-5 times the concentration of $NO_x$ (in molar ratio). The concentrations of $NO_x$ in gases were measured by the chemiluminescence method. The percentage of $NO_x$ removed was calculated according to the formula below:

$$100(\%) - \frac{A}{B}$$

where,
A=concentration of $NO_x$ in the gas discharged from the catalyst layer
B=concentration of $NO_x$ in the gas entering the catalyst layer The invention will be more clearly understood with reference to the following Examples and Comparative Examples.

EXAMPLE 1

Removal of $NO_x$ by hydrogenated zeolite catalysts

Experiments on the removal of $NO_x$ by a variety of hydrogenated zeolite catalysts were carried out. The results are shown in Table 1. In these experiments, the temperature of the reactor was kept at 400° C. and the flow rate of the simulated exhaust gas was 210 mL per minute (equivalent to the space velocity of 2500 hr$^{-1}$). It is noted from Table 1 that the percentages of $NO_x$ removed are zero in the cases of zeolites having silica/alumina ratios lower than 10 and that the percentages of $NO_x$ removed are higher than 30% in the cases of zeolites having silica/alumina ratios higher than 12. The results indicate that the hydrogenated zeolites themselves can remove $NO_x$ from the exhaust gas containing excess oxygen so long as the zeolites have silica/alumina ratios higher than about 10 and the exhaust gas is incorporated with an organic compound as the reducing agent.

TABLE 1

| Type of zeolite | Silica/alumina ratio | Percentage of $NO_x$ removed (%) |
| --- | --- | --- |
| Y type | 5.9 | 0 |
| L type | 6.2 | 0 |
| Offretite-erionite mixed crystal type | 7.4 | 0 |
| Mordenite type | 10.2 | 1 |
| Ferrierite type | 12.2 | 34.0 |
| Mordenite type | 14.9 | 35.0 |
| Ferrierite type | 20.5 | 41.0 |
| ZSM-5 type | 40.0 | 40.0 |

EXAMPLE 2

Removal of $NO_x$ by metal-impregnated hydrogenated zeolite catalysts

Experiments were carried out in the same manner as in Example 1 using a variety of catalysts impregnated with one or more metals selected from among nickel, copper, manganese, chromium, cobalt, zinc, iron, and vanadium. The results are shown in Table 2. It is noted from Table 2 that hydrogenated zeolites become more active when they are impregnated with metallic elements. The percentage of $NO_x$ removed is higher than 20% even when the silica/alumina ratio is lower than 10 (except in the case of zinc catalyst). And the percentage of $NO_x$ removed is higher than 60% if the silica/alumina ratio is higher than 10 (except in the case of zinc catalyst). Thus the percentage of $NO_x$ removed is greatly increased when hydrogenated-zeolites are impregnated with metallic elements.

TABLE 2

| Metallic element supported | Kind of carrier* | Silica/alumina ratio | Percentage of $NO_x$ removed (%) | Conversion into nitrogen gas (%) |
| --- | --- | --- | --- | --- |
| Copper | A | 5.9 | 100 | 100 |
|  | B | 12.2 | 100 | 99 |
|  | C | 14.9 | 100 | 100 |
|  | D | 40.0 | 100 | 100 |
| Vanadium | A | 5.9 | 33.6 | 100 |
|  | B | 12.2 | 86.8 | 100 |
|  | C | 14.9 | 84.5 | 99 |
|  | D | 40.0 | 86.2 | 99 |
| Chromium | A | 5.9 | 29.7 | 97 |
|  | B | 12.2 | 46.7 | 99 |
|  | C | 14.9 | 42.7 | 99 |
|  | D | 40.0 | 49.3 | 100 |
| Manganese | A | 5.9 | 81.1 | 100 |
|  | B | 12.2 | 97.9 | 100 |
|  | C | 14.9 | 89.2 | 99 |
|  | D | 40.0 | 99.1 | 100 |
| Cobalt | A | 5.9 | 20.7 | 98 |
|  | B | 12.2 | 77.3 | 100 |
|  | C | 14.9 | 88.4 | 97 |
|  | D | 40.0 | 89.8 | 99 |
| Nickel | A | 5.9 | 66.2 | 100 |
|  | B | 12.2 | 99.8 | 100 |
|  | C | 14.9 | 87.8 | 100 |
|  | D | 40.0 | 99.9 | 100 |
| Zinc | A | 5.9 | 13.7 | 97 |
|  | B | 12.2 | 23.5 | 96 |
|  | C | 14.9 | 22.3 | 95 |
|  | D | 40.0 | 23.0 | 98 |
| Iron | A | 5.9 | 25.4 | 92 |
|  | B | 12.2 | 66.5 | 100 |
|  | C | 14.9 | 65.7 | 100 |
|  | D | 40.0 | 68.3 | 97 |

*A: Y type, B: ferrierite type, C: mordenite type, D: ZSM-5 type

EXAMPLE 3

Effect of space velocity on the removal of $NO_x$ by metal-impregnated zeolite catalysts Similar experiments to those in Example 2 were carried out using copper catalysts or copper-nickel catalysts to examine the effect of space velocity on the removal of $NO_x$. No water vapor was added to the simulated exhaust gas in these experiments. The results are shown in Table 3. It is noted that catalysts on zeolites having a silica/alumina ratio lower than 10 achieve the percentage of $NO_x$ removed higher than 50% even when the space velocity is increased eight-fold (up to 20,000 hr$^{-1}$). In the case of catalysts on zeolites having silica/alumina ratios higher than 10, the percentage of $NO_x$ removed is higher than 90% at the same space velocity

TABLE 3

| Metallic element supported | Zeolite (silica/alumina ratio) | Space velocity (hr$^{-1}$) | Percentage of $NO_x$ removed (%) | Conversion into nitrogen gas (%) |
|---|---|---|---|---|
| Copper | Type Y (5.9) | 5000 | 100 | 100 |
| | | 10000 | 96.2 | 100 |
| | | 15000 | 64.5 | 99 |
| | | 20000 | 51.6 | 98 |
| | Ferrierite type (12.2) | 5000 | 100 | 100 |
| | | 10000 | 100 | 100 |
| | | 15000 | 100 | 100 |
| | | 20000 | 96.4 | 99 |
| | Mordenite type (14.9) | 5000 | 100 | 100 |
| | | 10000 | 100 | 100 |
| | | 15000 | 98.6 | 97 |
| | | 20000 | 87.3 | 98 |
| | ZSM-5 type (40.0) | 5000 | 100 | 100 |
| | | 10000 | 100 | 100 |
| | | 15000 | 100 | 98 |
| | | 20000 | 97.6 | 99 |
| Copper-nickel | Type Y (5.9) | 5000 | 100 | 96 |
| | | 10000 | 100 | 100 |
| | | 15000 | 92.5 | 100 |
| | | 20000 | 63.2 | 98 |
| | Ferrierite type (12.2) | 5000 | 100 | 100 |
| | | 10000 | 100 | 97 |
| | | 15000 | 100 | 99 |
| | | 20000 | 93.2 | 100 |
| | Mordenite type (14.9) | 5000 | 100 | 100 |
| | | 10000 | 100 | 96 |
| | | 15000 | 100 | 100 |
| | | 20000 | 98.8 | 99 |
| | ZSM-5 type (40.0) | 5000 | 100 | 100 |
| | | 10000 | 100 | 100 |
| | | 15000 | 100 | 95 |
| | | 20000 | 99.1 | 97 |

EXAMPLE 4

Identification of reaction products

The exhaust gas treated by the present catalysts may contain nitrous oxide ($N_2O$) and nitric acid as well as nitrogen gas. To identify these compounds, the treated exhaust gas was analyzed. Since the simulated exhaust gas does not contain nitrogen gas, it is possible to calculate the conversion of $NO_x$ into nitrogen from the amount of nitrogen produced. The determination of nitrogen and nitrous oxide was carried out by gas chromatography. The determination of nitric acid was carried out by alkali titration of the condensate recovered from the treated gas by cooling by ice. It was found that the amounts of nitrous oxide and nitric acid were smaller than the limit of detection.

In Tables 2 and 3, the conversion of $NO_x$ into nitrogen gas is expressed in percentage calculated under the assumption that 2 mol of $NO_x$ removed gives rise to 1 mol of nitrogen gas. It is noted that the metal-impregnated catalysts of the present invention convert $NO_x$ into nitrogen gas almost completely.

EXAMPLE 5

Denitration by natural mordenite

Experiments of denitration were carried out using metal-impregnated catalysts prepared from natural mordenite (from Akita Prefecture) treated by the direct hydrogenation. The metal impregnation was accomplished by the above-mentioned first method. The direct hydrogenation was accomplished by washing natural mordenite repeatedly with 2N hydrochloric acid at 100° C. for 40 hours. The metals impregnated on the catalysts were prepared mostly from nitrates (except palladium chloride, rhodium chloride, chloroplatinic acid, ammonium metavanadate, and ammonium molybdate). For metal impregnation, the catalyst was dipped in the aqueous solution (1 mol/L) of a volume three times as much as that of the catalyst, at 90° C. for 2 hours.

The conditions of experiments were as follows The catalyst bed was prepared by filling a column, 2 cm in inside diameter and 16 cm high, with catalyst particles, 10–20 mesh in size. The simulated exhaust gas was passed at a flow rate of 1 liter per minute. The simulated exhaust gas was composed of $N_2$ (80 vol%), $O_2$ (10 vol%), $CO_2$ (10 vol%), NO (0.17 vol%), and moisture produced by injecting 4 g of water per hour into the gas. The gas was preheated to the reaction temperature and incorporated with an organic compound as the reducing agent.

The results are shown in Table 4. Propane used as the reducing agent is a fuel-grade commercial product composed of 92% of propane, 8% of ethane, and 0.1% of isobutane. Gas oil is a commercial product for diesel cars. Other organic compounds are commercial reagents.

TABLE 4

| Element supported | Reaction temperature (°C.) | Name of reducing agent | Amount added (mg/min) | Ratio of Denitration (%) | Remarks |
|---|---|---|---|---|---|
| None | 430 | None | 0 | 8 | |
| None | 430 | Propane | 3.8 | 55 | |
| None | 430 | Gas oil | 4.3 | 47 | |
| None | 350 | Gas oil | 4.3 | 45 | |
| None | 430 | Gas oil | 4.3 | 47 | |
| None | 500 | Gas oil | 4.3 | 41 | |
| None | 430 | Ethanol | 6.0 | 57 | |
| None | 430 | Ethylene | 4.0 | 50 | |
| None | 430 | Acetone | 5.0 | 47 | |
| None | 430 | n-$C_{10}H_{22}$ | 7.0 | 55 | |
| None | 430 | Ether | 5.0 | 47 | |

TABLE 4-continued

| Element supported | Reaction temperature (°C.) | Name of reducing agent | Amount added (mg/min) | Ratio of Denitration (%) | Remarks |
|---|---|---|---|---|---|
| None | 430 | Isobuthane | 4.0 | 50 | |
| Copper | 400 | None | 0 | 8 | |
| Copper | 500 | None | 0 | 6 | |
| Copper | 600 | None | 0 | 3 | |
| Copper | 400 | Propane | 3.8 | 34 | |
| Copper | 500 | Propane | 3.8 | 36 | |
| Copper | 500 | Propane | 3.8 | 36 | $O_2 = 5\%$ |
| Copper | 600 | Propane | 3.8 | 38 | |
| Copper | 600 | Propane | 8.0 | 61 | |
| Copper | 600 | Propane | 11.4 | 74 | |
| Copper | 500 | Ethanol | 6.0 | 40 | |
| Copper | 500 | n-$C_{10}H_{22}$ | 7.0 | 50 | |
| Copper | 500 | Ether | 5.0 | 45 | |
| Copper | 500 | Acetone | 5.0 | 48 | |
| Chromium | 430 | None | 0 | 15 | |
| Chromium | 430 | Propane | 3.8 | 52 | |
| Nickel | 430 | None | 0 | 63 | |
| Nickel | 430 | Propane | 3.8 | 83 | |
| Nickel | 430 | Gas oil | 4.3 | 50 | |
| Nickel | 430 | n-$C_{10}H_{22}$ | 5.0 | 75 | |
| Nickel | 430 | Ethanol | 5.0 | 60 | |
| Iron | 430 | None | 0 | 7 | |
| Iron | 430 | Propane | 3.8 | 62 | |
| Cobalt | 430 | None | 0 | 27 | |
| Cobalt | 430 | Propane | 3.8 | 68 | |
| Cobalt | 430 | Gas oil | 4.3 | 50 | |
| Cobalt | 430 | Ethanol | 5.0 | 70 | |
| Palladium | 400 | None | 0 | 18 | |
| Palladium | 500 | None | 0 | 18 | |
| Palladium | 430 | None | 0 | 10 | |
| Palladium | 430 | Propane | 3.8 | 55 | |
| Palladium | 430 | Propane | 3.8 | 67 | |
| Manganese | 430 | None | 0 | 10 | |
| Manganese | 430 | Propane | 3.8 | 75 | |
| Manganese | 430 | Propane | 3.8 | 78 | |
| Manganese | 430 | Gas oil | 4.3 | 50 | |
| Manganese | 430 | n-$C_6H_{14}$ | 6.0 | 65 | |
| Manganese | 430 | n-$C_{10}H_{22}$ | 7.0 | 60 | |
| Manganese | 430 | Ethanol | 6.0 | 58 | |
| Manganese | 430 | Ethylene | 4.0 | 70 | |
| Manganese | 430 | Acetone | 5.0 | 65 | $O_2 = 5\%$ |
| Manganese | 430 | n-Butane | 4.0 | 70 | |
| Manganese | 430 | Isobutane | 4.0 | 70 | |
| Molybdenum | 430 | None | 0 | 10 | |
| Molybdenum | 430 | Propane | 3.8 | 51 | |
| Molybdenum | 430 | Gas oil | 4.3 | 45 | |
| Rhodium | 430 | None | 0 | 15 | |
| Rhodium | 430 | Propane | 3.8 | 51 | |
| Rhodium | 430 | Gas oil | 4.3 | 40 | |
| Platinum | 430 | None | 0 | 10 | |
| Platinum | 430 | Propane | 3.8 | 55 | |
| Platinum | 430 | Gas oil | 4.3 | 46 | |
| V—Mn binary | 300 | None | 0 | 15 | |
| V—Mn binary | 400 | None | 0 | 11 | |
| V—Mn binary | 300 | Propane | 3.8 | 27 | |
| V—Mn binary | 400 | Propane | 3.8 | 89 | |
| V—Mn binary | 400 | Propane | 7.3 | 95 | |
| V—Mn binary | 500 | Propane | 3.8 | 85 | |
| V—Mn binary | 400 | Gas oil | 4.3 | 60 | |
| Cr—Mn binary | 430 | Propane | 3.8 | 44 | |
| V—Ni binary | 430 | None | 0 | 9 | |
| V—Ni binary | 430 | Propane | 3.8 | 62 | |
| Cr—Ni binary | 430 | None | 0 | 16 | |
| Cr—Ni binary | 430 | Propane | 3.8 | 46 | |
| Cr—Ni binary | 430 | Gas oil | 4.3 | 33 | |
| Cr—Cu binary | 300 | None | 0 | 0 | |
| Cr—Cu binary | 400 | None | 0 | 16 | |
| Cr—Cu binary | 250 | Propane | 3.8 | 4 | |
| Cr—Cu binary | 300 | Propane | 3.8 | 10 | |
| Cr—Cu binary | 430 | Propane | 3.8 | 27 | |
| Cr—Cu binary | 300 | Gas oil | 4.3 | 27 | |
| Cr—Cu binary | 320 | Gas oil | 4.3 | 36 | |
| Cr—Cu binary | 430 | Gas oil | 4.3 | 27 | |
| Cr—V binary | 300 | None | 0 | 7 | |
| Cr—V binary | 330 | None | 0 | 8 | |
| Cr—V binary | 360 | None | 0 | 25 | |
| Cr—V binary | 300 | Propane | 3.8 | 36 | |
| Cr—V binary | 330 | Propane | 3.8 | 61 | |
| Cr—V binary | 360 | Propane | 3.8 | 63 | |

TABLE 4-continued

| Element supported | Reaction temperature (°C.) | Name of reducing agent | Amount added (mg/min) | Ratio of Denitration (%) | Remarks |
|---|---|---|---|---|---|
| Cr—V binary | 300 | Gas oil | 4.3 | 27 | |
| Cr—V binary | 360 | Gas oil | 4.3 | 22 | |
| Cr—Fe binary | 300 | None | 0 | 7 | |
| Cr—Fe binary | 330 | None | 0 | 14 | |
| Cr—Fe binary | 360 | None | 0 | 6 | |
| Cr—Fe binary | 380 | None | 0 | 6 | |
| Cr—Fe binary | 430 | None | 0 | 4 | |
| Cr—Fe binary | 300 | Propane | 3.8 | 58 | |
| Cr—Fe binary | 330 | Propane | 3.8 | 78 | |
| Cr—Fe binary | 380 | Propane | 3.8 | 58 | |
| Cr—Fe binary | 430 | Propane | 3.8 | 46 | |
| Cr—Fe binary | 300 | Gas oil | 4.3 | 52 | |
| Cr—Fe binary | 330 | Gas oil | 4.3 | 55 | |
| Cr—Fe binary | 380 | Gas oil | 4.3 | 33 | |
| Cr—Fe binary | 430 | n-$C_{10}H_{22}$ | 5.0 | 78 | |

EXAMPLE 6

Denitration by natural clinoptilolite

Similar experiments as in Example 5 were carried out except that the catalysts were prepared from clinoptilolite (from Fukushima Prefecture). Results are shown in Table 5.

TABLE 5

| Element supported | Reaction temperature (°C.) | Name of reducing agent | Amount added (mg/min) | Ratio of Denitration (%) | Remarks |
|---|---|---|---|---|---|
| None | 430 | Propane | 3.8 | 40 | |
| None | 430 | Gas oil | 4.3 | 40 | |
| None | 430 | n-$C_{10}H_{22}$ | 7.0 | 50 | |
| None | 430 | Ethanol | 6.0 | 54 | |
| None | 430 | Ether | 5.0 | 43 | |
| None | 430 | Isobutance | 4.0 | 40 | |
| Iron | 430 | None | 0 | 10 | |
| Iron | 430 | Propane | 3.8 | 40 | |
| Iron | 430 | Gas oil | 4.3 | 30 | |
| Chromium | 430 | None | 0 | 10 | |
| Chromium | 430 | Propane | 3.8 | 44 | |
| Chromium | 350 | Gas oil | 4.3 | 43 | |
| Chromium | 430 | Gas oil | 4.3 | 50 | |
| Chromium | 520 | Gas oil | 4.3 | 40 | |
| Manganese | 430 | None | 0 | 8 | |
| Manganese | 430 | Propane | 3.8 | 67 | |
| Manganese | 430 | Ethanol | 6.0 | 60 | |
| Manganese | 430 | Gas oil | 4.3 | 45 | |
| Manganese | 430 | n-$C_{10}H_{22}$ | 7.0 | 50 | |
| Nickel | 430 | None | 0 | 51 | |
| Nickel | 430 | Propane | 3.8 | 70 | |
| Nickel | 430 | Gas oil | 4.3 | 45 | |
| Cr—Fe binary | 430 | None | 0 | 10 | |
| Cr—Fe binary | 330 | Propane | 3.8 | 65 | |
| Cr—Fe binary | 430 | Propane | 3.8 | 40 | |
| Cr—Fe binary | 330 | Gas oil | 4.3 | 47 | |
| Cr—Fe binary | 380 | Gas oil | 4.3 | 40 | |

EXAMPLE 7

Denitration by catalysts hydrogenated by the indirect method

In this example the same raw material and impregnation method as in Example 5 were used except that the hydrogenation was carried out by the indirect method in the following manner. Natural mordenite rocks were crushed, and the resulting powder was dipped in an aqueous solution of ammonium chloride (2 mol/L) at 90° C. for 2 hours. The powder was then heated to 600° C. to volatilize ammonia. The results are shown in Table 6.

EXAMPLE 8

Effect of the second impregnation method

The catalyst was prepared from the natural mordenite as in Example 5. The zeolite was caused to support a desired metallic element and then hydrogenated by the ammonium ion exchange according to the above-mentioned second impregnation method. The results are shown in Table 6.

EXAMPLE 9

Effect of the third impregnation method

The catalyst was prepared from the same zeolite as in Example 5. The zeolite was caused to support a desired metallic element according to the above-mentioned third impregnation method. The results are shown in Table 6.

TABLE 6

| Example No. | Element supported | Reaction temperature (°C.) | Name of reducing agent | Amount added (mg/min) | Ratio of Denitration (%) |
|---|---|---|---|---|---|
| 7 | None | 430 | None | 0 | 0 |
| 7 | None | 430 | Propane | 3.8 | 59 |
| 7 | None | 430 | Gas oil | 4.3 | 32 |
| 7 | Manganese | 430 | None | 0 | 3 |
| 7 | Manganese | 430 | Propane | 3.8 | 69 |
| 7 | Manganese | 430 | Gas oil | 4.3 | 55 |
| 7 | Iron | 430 | Propane | 3.8 | 40 |
| 7 | Copper | 430 | Propane | 3.8 | 35 |
| 8 | Manganese | 430 | None | 0 | 10 |
| 8 | Manganese | 430 | Propane | 3.8 | 67 |
| 8 | Manganese | 430 | Gas oil | 4.3 | 35 |
| 9 | Manganese | 430 | Propane | 3.8 | 86 |
| 9 | Nickel | 430 | None | 0 | 5 |
| 9 | Nickel | 430 | Propane | 3.8 | 59 |

COMPARATIVE EXAMPLE 1

Removal of $NO_x$ by unhydrogenated zeolites

Experiments were carried out under the same conditions as in Example 1 except that the zeolite was not hydrogenated. The results are shown in Table 7. It is noted that only very little $NO_x$ was removed.

COMPARATIVE EXAMPLE 2

Removal of $NO_x$ by hydrogenated zeolite catalysts in the absence of organic compounds Experiments were carried out under the same conditions as in Example 1 except that the organic compound as the reducing agent was not added. The results are shown in Table 7. It is noted that only very little $NO_x$ was removed.

COMPARATIVE EXAMPLE 3

Removal of $NO_x$ by metal-impregnated hydrogenated zeolite catalysts in the absence of organic compounds Experiments were carried out using metal-impregnated catalysts under the same conditions as in Example 2 except that no organic compound as the reducing agent was added. The results are shown in Table 7. It is noted that the percentage of $NO_x$ removed was less than 10%.

TABLE 7

| Zeolite | Silica/alumina ratio | Removal of $NO_x$ (%) Comparative Example 1 | Comparative Example 2 | Comparative Example 3 |
|---|---|---|---|---|
| A | 5.9 | 0 | 0 | 3 |
| B | 12.2 | 1 | 7 | 0 |
| C | 14.9 | 0 | 0 | 4 |
| D | 40.0 | 2 | 5 | 9 |

Designation of zeolite:
A: Zeolite of Y type
B: Zeolite of ferrierite type
C: Zeolite of mordenite type
D: Zeolite of ZSM-5 type

What is claimed is:

1. A method for removing nitrogen oxides from exhaust gas containing oxygen and moisture, comprising the step of
   bringing the exhaust gas into contact with a hydrogenated zeolite catalyst selected from the group consisting of hydrogenated synthetic zeolites, hydrogenated natural zeolites, hydrogenated synthetic zeolites impregnated with one or more metals selected from the group consisting of copper, zinc, vanadium, chromium, manganese, iron, cobalt, nickel, rhodium, palladium, platinum and molybdenum, and hydrogenated natural zeolites impregnated with one or more metals selected from the group consisting of copper, zinc, vanadium, chromium, manganese, iron, cobalt, nickel, rhodium, palladium, platinum, and molybdenum, in the presence of organic compounds as a reducing agent selected from the group consisting of hydrocarbons, alcohols, ketones, or ether, at a temperature sufficient to cause reaction between said hydrogenated zeolite catalyst and said nitrogen oxides.

2. A method for removing nitrogen oxides from exhaust gas as claimed in claim 1, wherein the zeolite catalyst is a zeolite having a silica/alumina ratio of 5 or above.

3. A method for removing nitrogen oxides from exhaust gas as claimed in claim 1 or claim 2, wherein the hydrogenated zeolite catalyst is any one of zeolite of Y type, zeolite of L type, zeolite of offretite-erionite mixed crystal type, zeolite of ferrierite type, zeolite of mordenite type, zeolite of clinoptilolite type, and zeolite of ZSM-5 type.

* * * * *